United States Patent [19]

Chernyakov et al.

[11] Patent Number: 5,730,779
[45] Date of Patent: Mar. 24, 1998

[54] FLUOROCHEMICAL RECOVERY AND RECYCLE USING MEMBRANES

[75] Inventors: Iosif Chernyakov, Jackson Heights, N.Y.; Thomas Hsiao-Ling Hsiung, Emmaus, Pa.; Alexander Schwarz, Bethlehem, Pa.; James Hsu-Kuang Yang, Allentown, Pa.

[73] Assignee: Air Products and Chemicals, Inc., Allentown, Pa.

[21] Appl. No.: 741,843

[22] Filed: Oct. 31, 1996

[51] Int. Cl.$^6$ ............ B01D 53/22; B01D 53/04; B01D 47/00

[52] U.S. Cl. .................. 95/45; 95/47; 95/53; 95/90; 95/149; 95/288

[58] Field of Search ............... 95/45, 47–56, 95/39, 90, 149, 288

[56] References Cited

U.S. PATENT DOCUMENTS

| | | | |
|---|---|---|---|
| Re. 33,678 | 9/1991 | Campbell et al. | 95/52 X |
| 4,119,417 | 10/1978 | Heki et al. | 55/158 |
| 4,180,388 | 12/1979 | Graham et al. | 55/16 |
| 4,435,191 | 3/1984 | Graham | 95/51 |
| 4,597,777 | 7/1986 | Graham | 95/51 |
| 4,599,096 | 7/1986 | Burr | 95/51 X |
| 4,654,063 | 3/1987 | Auvil et al. | 62/18 |
| 4,701,187 | 10/1987 | Choe et al. | 55/16 |
| 4,781,907 | 11/1988 | McNeill | 95/51 X |
| 4,787,919 | 11/1988 | Campbell et al. | 95/52 X |
| 4,894,068 | 1/1990 | Rice | 55/16 |
| 4,895,989 | 1/1990 | Sander et al. | 95/52 X |
| 4,964,886 | 10/1990 | Brugerolle et al. | 95/51 |
| 5,051,114 | 9/1991 | Nemser et al. | 95/51 X |
| 5,064,446 | 11/1991 | Kusuki et al. | 95/53 |
| 5,240,471 | 8/1993 | Barbe et al. | 95/54 |
| 5,252,219 | 10/1993 | Xu | 210/640 |
| 5,282,969 | 2/1994 | Xu | 95/45 X |
| 5,378,263 | 1/1995 | Prasad | 95/45 X |
| 5,417,742 | 5/1995 | Tamhankar et al. | 95/96 |
| 5,455,016 | 10/1995 | Choe et al. | 95/47 X |
| 5,482,539 | 1/1996 | Callahan | 95/45 X |
| 5,502,969 | 4/1996 | Jin et al. | 62/11 |
| 5,538,536 | 7/1996 | Fuentes et al. | 95/45 |

OTHER PUBLICATIONS

Glenn M. Tom, et al., "PFC Concentration and Recycle" Mat. Res. Soc. Symp. Proc. vol. 344, 1994, pp. 267–271.
Denis Rufin presentation at semiconductor PFC workshop in Austin Texas, Feb. 7, 1996.
Air Products and Chemicals, Inc. and Radian International L.L.C., PFC Recovery Systems for the Electronics Industry, 1996, Publication No. 325-95410.
Rautenbach, et al., Gas Permeation–Module Design and Arrangement, Chem. Eng. Process, 21 (1987) pp. 141–150.
"PFC Capture Alpha Systems Testing Update", Rufin, et al., PFC Technical Update SEMI 1996.
"PFC Capture Alpha Systems Testing Update", Cummins, et al., SEMI 1996.

Primary Examiner—Robert Spitzer
Attorney, Agent, or Firm—Geoffrey L. Chase

[57] ABSTRACT

A method for the separation and recovery of fluorochemicals from a gas stream containing a diluent gas and fluorochemicals by contact of the gas stream with a membrane, comprising the steps of: compressing a gas stream containing a diluent gas and fluorochemicals to an elevated pressure; heating the gas stream containing a diluent gas and fluorochemicals to an elevated temperature sufficient to increase the flux of the permeate stream and to increase the selectivity of the membrane for the permeation of the diluent gas relative to the permeation of the fluorochemicals; contacting the gas stream with a membrane which is selectively more permeable to the diluent gas than the fluorochemicals to result in a permeate stream rich in the diluent gas and a retentate rich in fluorochemicals; contacting the gas stream with one or more additional membranes which are selectively more permeable to the diluent gas than the fluorochemicals to result in a second permeate stream rich in the diluent gas and a second retentate rich in fluorochemicals; and recycling the second permeate stream to be compressed with the gas stream containing diluent gas and fluorochemicals to an elevated pressure. Preferably, the second retentate rich in fluorochemicals is further purified by adsorption or low temperature rectification to provide a fluorochemical-rich product stream and a diluent-rich vent stream.

10 Claims, 3 Drawing Sheets

FLUOROCHEMICAL RECOVERY AND RECYCLE USING MEMBRANES

BACKGROUND OF THE INVENTION

The semiconductor industry uses fluorinated gases, such as carbon tetrafluoride and hexafluoroethane, as etchants and cleaning gases in semiconductor manufacturing processes. These gases do not fully react within the reaction chamber. The unused gases enter the atmosphere through the process effluent from such reactors. These gases have long persistence in the atmosphere and absorb infrared radiation. These gases are, therefore, potential global warming gases. The industry has sought ways to diminish the amount of fluorinated gases reaching the atmosphere and ways to potentially recycle such gases for further utilization particularly in light of their low utilization on a single pass basis for their intended etching and cleaning purposes.

Fluorochemicals, such as perfluorinated hydrocarbons and perfluorinated chemicals, are used in the semiconductor industry as safe and noncorrosive sources of fluorine. In plasma environments, fluorochemicals, such as fluorinated gases, form fluorine species which are capable of etching wafers or cleaning insides of reactor chambers. The gaseous products of the etching or cleaning process are exhausted from the reactor chamber to the scrubber or vent systems of the semiconductor fabrication plant with potential for venting to atmosphere. Conversion of fluorinated gases to other products is not complete. Experiments have shown that in some cases less than 10% of hexafluoroethane used in the plasma process exits the reaction chamber in some form of a disassociated species or by-product.

Abatement of fluorochemicals currently follows several techniques. One method currently used by the semiconductor industry for insuring that fluorochemicals are not released to the environment involves combustion of the fluorochemicals contained in an effluent stream. While this method effectively destroys the fluorochemicals, thus preventing environmental pollution, it also makes it impossible to reuse the fluorochemicals. This method is also disadvantageous because it generates waste gases, such as hydrogen fluoride and nitrogen oxides, which require further treatment. Furthermore, combustion processes require fuel and oxygen to operate, adding further operating and capital cost to the semiconductor and manufacturing operation.

Alternatively, these fluorochemicals can be recovered for reuse. One process proposed for the recovery of fluorochemicals is adsorption wherein fluorochemicals are adsorbed onto an adsorbent under elevated pressure and desorbed from the adsorbent under lower pressure. This method is disadvantageous because very high power consumption is needed to carry out the requisite pressurization and depressurization.

Glenn M. Tom, et al. in the article "PFC Concentration and Recycle", Mat. Res. Soc. Symp. Proc. Vol. 344, 1994, pp 267–272 describes a process for concentrating perfluorinated gases using carbon-containing adsorptive beds. This process requires considerable energy demands based upon pressurization and depressurization to maintain a continuous process in switching adsorptive beds.

U.S. Pat. No. 5,502,969 discloses a process using a mass transfer contact zone with a wash liquid and one or more stages of cryogenic distillation to recover fluorine compounds from a carrier gas such as those constituting an effluent stream from a semiconductor facility. Both cryogenics and adsorption comprise energy-intensive and capital-intensive separatory processes.

Denis Rufin in a presentation at a semiconductor PFC workshop in Austin, Tex., Feb. 7, 1996; presented a process for recycling perfluorochemicals from a process tool involving compression, wet and dry scrubbing, additional compression, filtration, a concentration step followed by condensation and packaging for recycle after offsite purification, certification and additional repackaging. The perfluorocarbon concentration unit disclosed in the process sequence was not identified. Rufin made a similar presentation at Semicon West, PFC CAPTURE ALPHA SYSTEMS TESTING UPDATE, 1996, pp 49–54.

U.S. Pat. No. 4,119,417 discloses a process wherein a feed gas stream is passed over two cascade connected semipermeable membranes with the permeate stream from the second membrane being recycled to the feed gas prior to the first membrane. The process is typified by a separation of nitrogen from krypton. Other gases which can be separated from various binary mixtures include hydrogen, helium, nitrogen, oxygen, air, neon, argon, krypton, xenon, radon, fluorine, chlorine, bromine, uranium hexafluoride, ozone, hydrocarbons, sulfur dioxide, vinyl chloride, acrylonitrile and nitrogen oxides. The membranes utilized for these separations include silicon rubber, polybutadiene rubber, polyethylene, tetramethyl pentane resin, cellulose acetate, ethyl cellulose, Nuclear Pore, a material produced by General Electric, tetrafluoroethylene, polyester and porous metal membranes.

U.S. Pat. No. 4,654,063 discloses a process for conducting hydrogen purification using a semi-permeable membrane along with a non-membrane type separation wherein the retentate from the membrane can be further processed in a cryogenic or adsorptive separation system.

U.S. Pat. No. 4,701,187 discloses the use of cascade membranes wherein the retentate from a first membrane is conducted to a second membrane and the retentate from the second membrane is conducted to a down stream further adsorptive separation for product recovery. The permeated stream from the second membrane is recycled to the feed of the first membrane.

Air Products and Chemicals, Inc. and Radian International L.L.C. publicized a process titled PFC Recovery Systems for the Electronics Industry, 1996, Publication No. 325-95410 depicting a process wherein a fluorinated mixture of vacuum pump diluent and gases from a process tool of a semiconductor fabrication facility passes through a guard bed and a wet scrubber followed by gas compression, drying and adsorption with recycle of a portion of the purified diluent from the adsorbers to before the gas compression, while the more concentrated fluorinated gases pass through further gas compression, condensation and distillation to recover a product, such as 99.9+% hexafluoroethane. The process can be designed to recover hexafluoroethane, carbon tetrafluoride, trifluoromethane, nitrogen trifluoride and sulfur hexafluoride.

Rautenbach, et al., Gas Permeation-Module Design and Arrangement, Chem. Eng. Process, 21, 1987, pp. 141–150 discloses various membrane arrangements for gas separation.

Additional patents of interest include U.S. Pat. No. 4,180,388, 4,894,068, 5,240,471 and 5,252,219.

The prior art, although addressing the problem of capture and recycle of fluorochemicals used in the semiconductor industry, such as perfluorinated compounds and more specifically perfluorocarbons, has failed to provide a low capital cost, low energy-intensive process for the capture and concentration of the desired fluorinated compounds as is achieved by the present invention, which will be set forth in greater detail below.

BRIEF SUMMARY OF THE INVENTION

The present invention is a method for the separation and recovery of fluorochemicals from a gas stream containing a diluent gas and fluorochemicals by contact of the gas stream with a membrane, comprising the steps of:

(a) compressing a gas stream containing a diluent gas and fluorochemicals to an elevated pressure;

(b) heating the gas stream containing a diluent gas and fluorochemicals to an elevated temperature sufficient to increase the flux of the permeate stream of step (c) and to increase the selectivity of the membrane of step (c) for the permeation of the permeate stream of step (c) relative to the permeation of the retentate of step (c);

(c) contacting the gas stream with a membrane which is selectively more permeable to the diluent gas than the fluorochemicals to result in a permeate stream rich in the diluent gas and a retentate rich in fluorochemicals;

(d) contacting the retentate with one or more additional membranes which are selectively more permeable to the diluent gas than the fluorochemicals to result in a second permeate stream rich in the diluent gas and a second retentate rich in fluorochemicals; and (e) recycling the second permeate stream to step (a) to be compressed with the gas stream containing diluent gas and fluorochemicals to an elevated pressure.

Preferably, the gas stream containing a diluent gas and fluorochemicals is initially scrubbed to remove particulates and water soluble components of the gas stream.

Preferably, after step (e) the second retentate rich in fluorochemicals is further purified by adsorption or low temperature rectification to provide a fluorochemical-rich product stream and a diluent-rich vent stream.

Preferably, the gas stream containing a diluent gas and fluorochemicals contains fluorochemicals selected from the group consisting of $NF_3$, $SF_6$, $CF_4$, $CHF_3$, $CH_3F$, $C_2F_6$, $C_2HF_5$, $C_3F_8$, $C_4F_8$ and mixtures thereof.

Preferably, the gas stream containing a diluent gas and fluorochemicals is an effluent gas stream from a semiconductor fabrication process.

Preferably, the membranes are selected from the group consisting of polysulfone, polyetherimide, ethyl cellulose, and mixtures thereof.

Preferably, the rectification is driven by heat exchange of the overhead in a rectification column to produce reflux.

Preferably, the fluorochemical-rich product stream comprises $C_2F_6$.

Preferably, the diluent gas is selected from the group consisting of nitrogen, helium, argon and mixtures thereof.

Preferably, the fluorochemical rich product stream is recycled to the semiconductor fabrication process.

DETAILED DESCRIPTION OF THE INVENTION

Figure 1:
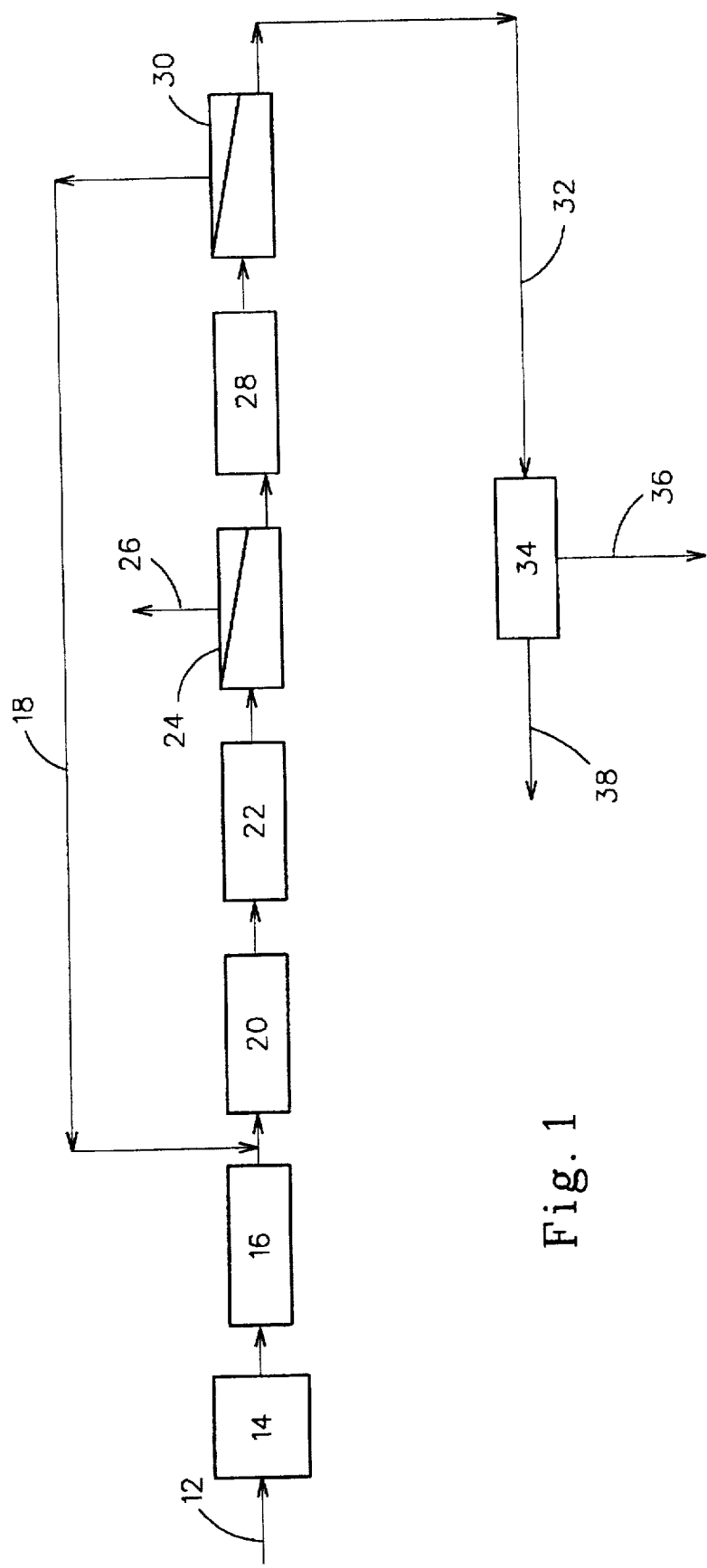
FIG. 1 is a schematic illustration of a preferred embodiment of the present invention.

The present invention is a process to recover fluorochemicals, such as $NF_3$, $SF_6$, $CF_4$, $CHF_3$, $CH_3F$, $C_2F_6$, $C_2HF_5$, $C_3F_8$, $C_4F_8$ and mixtures thereof from the exhausts of semiconductor fabrication facilities. These types of gases are used for etching and cleaning operations in the fabrication of various electronic devices from electronic materials including the construction of integrated circuits. These gases typically have low utilization in any given process cycle; therefore, the effluent from the processes will contribute to the environmental concern of global warming. In addition, these gases have considerable value if they can be concentrated, purified and recycled for additional utilization.

The present invention achieves the capture, recovery and purification for potential recycle of the fluorochemicals described above, wherein the exhaust stream from a semiconductor fabrication facility which is typically rich in vacuum pump diluent, such as nitrogen or other inert gas, is sent after compression and scrubbing to a heating zone to elevate the temperature of the gas stream containing a diluent gas and fluorochemicals before being introduced into a membrane which is more permeable to the diluent gas than the fluorochemicals in the gas stream so as to separate the diluent gas from the fluorochemical gas components. This produces a permeate stream rich in vacuum pump diluent and a retentate which is rich in the fluorochemicals.

The retentate, comprising an enriched stream of fluorochemicals is sent to a second cascade membrane station while the permeate stream, rich in diluent gas is vented. In the second stage membrane in cascade relationship to the first stage membrane, the fluorochemicals are again rejected by the membrane, while the remaining diluent gas permeates selectively through the membrane as a permeate stream. The permeate stream is recycled to the compression upstream of the first stage membrane to capture fluorochemicals, which in minor proportion may have copermeated through the membranes.

The second stage membrane, as well as the first stage membrane, is operated at elevated temperature to increase the flux of diluent gas through the membrane, while increasing the selectivity between the diluent gases and the fluorochemical gas components.

Depending upon the makeup of the feed gas stream containing diluent gas and fluorochemicals, additional stages of cascade connected membranes may be utilized, wherein the fluorochemical desired for recovery is rejected by the membrane and the diluent gas permeates through at a high rate of flux and with greater selectivity at elevated temperature for recycle to the first or initial stage of membrane separation for potential recovery of copermeating desired fluorochemicals.

The final retentate from the cascading multi-staged membrane separation, wherein the fluorochemicals rejected and concentrated have not passed through the semi-permeable membrane can then be further processed for higher purification in a typical distillation or adsorptive separation prior to being used as a recycled product for reutilization by the semiconductor fabrication industry or particularly the particular process from which the fluorochemicals were taken as an effluent stream.

The membrane material may be comprised of polysulfone, polyetherimide, polypropylene, cellulose acetate, polymethylpentane, amorphous copolymers based on 2,2-bistrifluoromethyl-4,5-difluoro-1,3-dioxole, polyvinyltrimethylsilane, polyimide, polyamide, polyaramide or ethyl cellulose polymer, all of which can be configured in hollow fiber, spiral wound or flat sheet geometries.

In the present invention, it has been unexpectedly ascertained that in conducting the membrane separation of fluorochemicals from diluent gases, such as nitrogen and helium, the operation of the membrane at elevated temperature has the surprising effect of not only increasing the flux rate or the permeance of the diluent gas through the membrane, but also increasing the selectivity between the diluent gas, such as nitrogen, and the fluorochemicals. Traditionally, elevated temperatures increase flux rates of the designed permeating stream, but at the risk of reducing selectivity, whereby the designed retentate specie also copermeates at an increased permeance or flux rate.

The present invention has found the unique circumstance that increasing the temperature at which the membrane operates, such as by heating the feed gas stream to the membrane, when separating the gas mixtures typically found in semiconductor fabrication clean or etching effluents containing fluorochemicals, that the elevated temperature using the membranes studied results in increased flux or permeance rates for the diluent gas, such as nitrogen, while also unexpectedly increasing the selectivity between the diluent gas and the retentate or fluorochemicals, such as the fluorochemicals and perfluorochemicals mentioned above. This unexpected finding provides enhanced operational performance of the present invention, whereby increased throughput can be provided at the cost of heat energy while providing even greater selectivity and, therefore, downstream purity of the fluorochemicals captured and isolated for recovery and potential reutilization.

Depending upon the amount of purity desired and whether downstream additional processing, such as distillative or adsorptive purification is contemplated, the two-stage cascade-connected membrane process of the present invention can be expanded to include a plurality of series cascade-connected membranes, wherein the retentate from each membrane constitutes the feed to the ensuing membrane. The permeate stream comprising diluent gas after the first stage membrane would typically be recycled to capture fluorochemicals desired for concentration, recertification and reutilization in the process of the present invention.

The elevated pressure contemplated for the separation of the present invention typically would be a pressure greater than 70 psia and more preferably pressures of 100–200 psia. The temperatures to which the process may be subjected to achieve the enhanced performance characteristics of increased permeate flux and increased selectivity between the permeate and the retentate would be temperatures above ambient, typically 100°–150° F. and preferably approximately 120° F.

The process of the present invention will now be set forth in greater detail regarding a preferred embodiment with reference to FIG. 1. In FIG. 1, a fluorochemical containing exhaust gas from a semiconductor fabrication facility conducting an etch or clean process step is provided in stream 12 comprising a diluent gas, such as nitrogen, and fluorochemicals comprising potentially $NF_3$, $SF_6$, $CF_4$, $CHF_3$, $CH_3F$, $C_2F_6$, $C_2HF_5$, $C_3F_8$, $C_4F_8$, HF, $F_2$ and mixtures of these gases. Additional components in this mixture include; CO, $CO_2$, $H_2O$, $O_2$, $CH_4$, $SiF_4$, $SiH_4$, $COF_2$, $N_2O$, $NH_3$, $O_3$, Ar, $Br_2$, BrCl, $CCl_4$, $Cl_2$, $H_2$, HBr, HCl, He and $SiCl_4$. This gas mixture is typically removed via a vacuum pump 14 from the semiconductor fabrication facility. The gas stream potentially contains particulates which can be filtered out. Other components which are amenable to wet and dry scrubbing are removed in station 16, which typically removes soluble fluorides such as fluorine, hydrogen fluoride and carbonyl fluoride. The wet scrubbing would typically be an aqueous scrubbing solution which removes the soluble fluorides.

The scrubbed gas stream is then commingled with a recycle stream 18 and sent to compressor 20 to be compressed to a pressure greater than 70 psia, and preferably in range of 100–200 psia. The gas stream at elevated pressure is then further heated in indirect heat exchanger 22 against any elevated temperature process stream, such as a process stream for the semiconductor manufacturing facility or a heater or export steam from any given process. The gas stream containing diluent gas and fluorochemicals is heated to a temperature above ambient, typically below 200° F. or any temperature below the decomposition of the membrane stages yet to be contacted and preferably 100°–150° F., most preferably approximately 120° F.

The feed gas stream then contacts a first stage of a semi-permeable membrane 24 wherein the diluent gas, such as nitrogen, and a certain amount of fluorochemicals in low quantities or low concentrations permeate with increased selectivity between the two due to the elevated temperature to become a permeate stream in line 26 which is acceptably vented or treated as an effluent from the process.

The retentate or stream which does not permeate the semi-permeable membrane in stage 24 is removed with an enriched content of the fluorochemicals. This stream is further heated to an elevated temperature in heat exchanger 28 comparable to the heating discussed in heat exchanger 22. The elevated pressure and elevated temperature gas stream which is the retentate from the first membrane in station 24 contacts an additional membrane stage in station 30 producing a second permeate stream comprising substantially diluent gas, such as nitrogen, and a minor amount of fluorochemicals, while also producing a second retentate, which does not permeate the membrane, as a stream rich in fluorochemicals that can be further processed through additional stages of membranes in a comparable context depending upon purities and the gas mixture being separated. The permeate stream from the second and all ensuing stages of the membrane station(s) 30 is recycled as stream 18 upstream of the compression stage 20 in order to recapture fluorochemicals which may copermeate to a minor degree with the diluent gas. The elevated temperature operation of the membranes diminishes the concentration of these recycled fluorochemicals, due to the elevated temperature having the effect of increasing the permeate flux while increasing selectivity between the diluent gas and the fluorochemicals.

The product as stream 32 may be recycled back to the semiconductor process or can be further enhanced or purified for reutilization and recertification by a passage through appropriate distillation or adsorption in station 34 producing a fluorochemical product 38 which typically could comprise 99.9% hexafluoroethane and a by-product stream 36 which could contain other fluorochemical gases, such as carbon tetrafluoride. The distillative or adsorptive post-treatment stage in station 34 can be directly connected with the membrane purification upstream or alternatively, the fluorochemical gas stream resulting in line 32 could be packaged for transport to a central location removed or isolated from the membrane separation for further distillative or adsorptive purification repackaging and recertification for reuse by the semiconductor fabrication facility or facilities of similar demands.

Various downstream optional distillation processes can be contemplated, but a preferred distillation process would utilize liquid nitrogen cryogenic fluid to operate the overhead condenser of a distillation column to provide reflux to the column, while heating by any traditional means could provide reboil to a column, wherein the column is operated initially to purify carbon tetrafluoride from inert gases, such as nitrogen, and subsequently the column is operated to remove hexafluoroethane from the sump of the distillation column to provide high purity gaseous hexafluoroethane product for repackaging and recycle.

Although the process has been described with regard to producing 99.9+% hexafluoroethane, it is also possible to reconfigure the process to produce carbon tetrafluoride, trifluoromethane, octafluoropropane, octafluorobutane, nitrogen trifluoride or sulfur hexafluoride, which are all widely used gases comprising fluorochemicals in etch and clean processes of the semiconductor fabrication industry. An important aspect of the present invention is the use of elevated temperatures in a membrane separation to separate inert diluent gases from fluorochemicals. Typically, elevated temperatures increase flux at the loss of selectivity. However, in the present invention, it has been found that not only does the flux of the permeate stream increase, but the selectivity between the diluent gas and the fluorochemical is increased given the elevated temperatures of the present invention and the membranes amenable to separating diluent inert gases, such as nitrogen, from fluorochemicals, such as hexafluoroethane.

Figure 2:
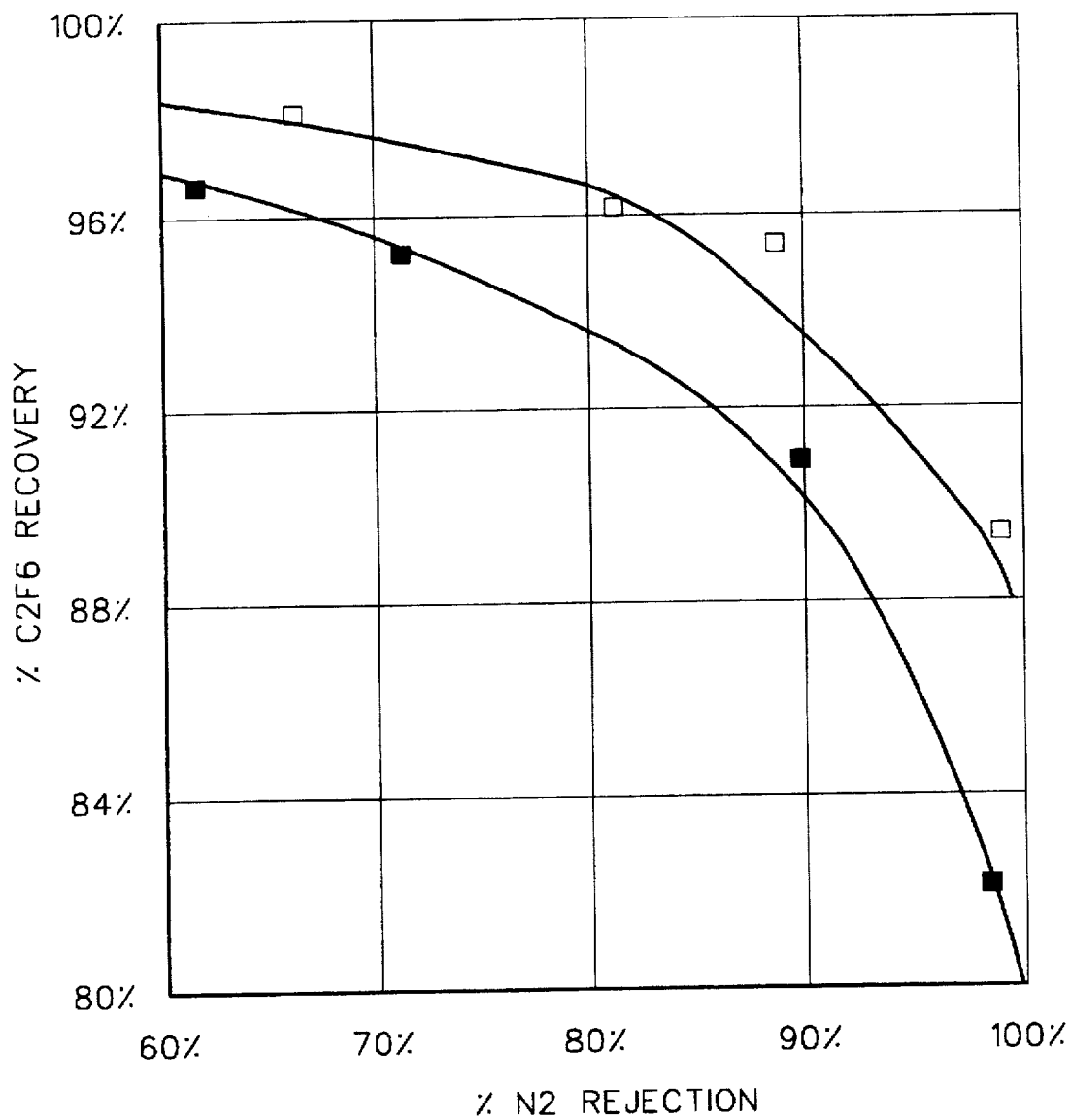
FIG. 2 is a graph of % $C_2F_6$ Recovery vs. % $N_2$ Rejection by volume of a gas stream containing 0.6% $CF_4$, 1.4% $C_2F_6$, and the balance $N_2$ at two different temperatures of 70° F. and 120° F. using a polysulfone membrane.

With regard to FIG. 2, a comparison of a 70° F. stream of 0.6% carbon tetrafluoride, 1.4% hexafluoroethane and the balance nitrogen in comparison to a comparable stream at 120° F. is graphed in relation to the percent hexafluoroethane recovery ($C_2F_6$ in retentate/$C_2F_6$ in feed) against the percent of nitrogen rejection ($N_2$ in permeate/$N_2$ in feed). This is in the context of a polysulfone membrane. As can be seen, the recovery of hexafluoroethane for a given rejection of nitrogen by the membrane at increased temperature is uniformly superior to the recovery for the same rejection at lower temperatures. The enhanced flux rate is set forth in greater detail with regard to Table 1 below.

TABLE 1

| | Polysulfone | | | |
|---|---|---|---|---|
| | P/L 70° F.* | $N_2/C_2F_6$ selectivity | P/L 120° F.* | $N_2/C_2F_6$ selectivity |
| $N_2$ | $3.2 \times 10^{-6}$ | 27 | $7.9 \times 10^{-6}$ | 53 |
| $C_2F_6$ | $1.2 \times 10^{-7}$ | | $1.5 \times 10^{-7}$ | |

*P/L is permeability divided by membrane thickness in units of scc/(cm².sec.cm Hg)

Figure 3:
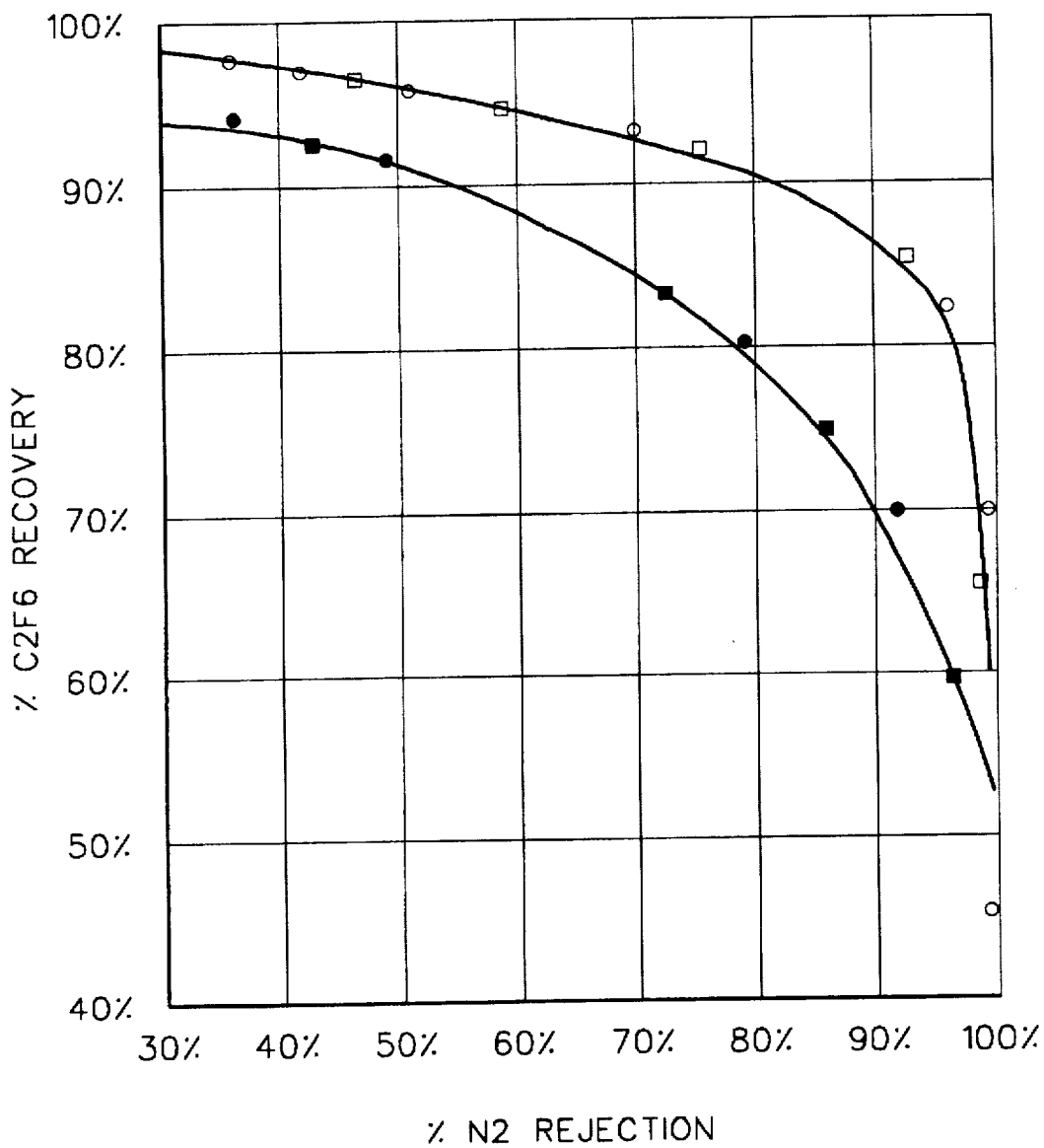
FIG. 3 is a graph of % $C_2F_6$ Recovery vs. % $N_2$ Rejection by volume of two gas streams, one having 0.75% $NF_3$, 0.35% $C_2F_6$, 0.04% $SF_6$ and the balance nitrogen, while the other has 0.6% $CF_4$, 1.4% $C_2F_6$ and the balance nitrogen, each at temperatures of 70° F. and 130° F. using an ethyl cellulose membrane.

The present invention has also been evaluated with regard to the unexpected property of elevated temperature membrane separation of fluorochemicals from inert gases by using an ethyl cellulose membrane as depicted in FIG. 3. Again a graph of hexafluoroethane percent recovery versus percent nitrogen rejection is illustrated with regard to a stream comprising 0.75% nitrogen trifluoride, 0.35% hexafluoroethane, 0.04% sulfur hexafluoride and the balance of nitrogen at 70° and 130° F., as well as a stream containing 0.6% carbon tetrafluoride, 1.4% hexafluoroethane and the balance of nitrogen both at 70° F. and 130° F. In each instance the similar phenomena holds true, that the selectivity for the diluent gas increases with the flux rate for the diluent gas at the higher or more elevated temperature. The increased flux rate again is further illustrated by reference to Table 2 for ethyl cellulose membranes set forth below.

TABLE 2

| | Ethyl Cellulose | | | |
|---|---|---|---|---|
| | P/L 70° F.* | $N_2/C_2F_6$ selectivity | P/L 130° F.* | $N_2/C_2F_6$ selectivity |
| $N_2$ | $3.7 \times 10^{-5}$ | 7.6 | $7.7 \times 10^{-5}$ | 20 |
| $C_2F_6$ | $4.9 \times 10^{-6}$ | | $3.7 \times 10^{-6}$ | |

*P/L is permeability divided by membrane thickness in units of scc/(cm².sec.cm Hg)

The capture, recovery, concentration and recycle of fluorochemicals, such as perfluorochemicals and more particularly perfluorocarbons has been a vexing problem for the semiconductor fabrication industry, which widely utilizes such fluorochemicals for etching and cleaning operations in the production of electronic devices and integrated circuits. Various attempts at providing economical, effective processes for abatement of fluorochemicals have been proffered by the prior art to avoid the venting or distribution of such fluorochemicals to the atmosphere, where they constitute a problem for their global warming potential. These prior art processes have typically been capital intensive requiring elaborate equipment and are energy intensive requiring significant compression and loss of compression in processing as well as circulating energy requirements dictated by physical adsorptive wash systems and multiple cryogenic distillation columns. The present invention overcomes these drawbacks to provide a viable process for fluorochemical capture, concentration, purification and potential recycle using relatively modest capital requirements of continuously running selective membrane systems. The unique utilization of elevated temperatures under the conditions of the present invention using appropriate membranes selective to the permeance of inert gases, such as nitrogen, and the concentration of the desired fluorochemicals, increases the flux of the permeate stream while enhancing selectivity of the diluent gas with respect to the fluorochemical to provide enhanced degrees of efficiency and economy in the processing of fluorochemicals by the present invention. Concentration of the fluorochemical at or near the membrane feed pressure in the present invention provides savings in downstream energy requirements over the prior art systems.

The present invention has been set forth with regard to several preferred embodiments, but the full scope of the invention should be ascertained by the claims which follow.

We claim:

1. The method for the separation and recovery of fluorochemicals from a gas stream containing a diluent gas and fluorochemicals by contact of the gas stream with a membrane, comprising the steps of:

(a) compressing a gas stream containing a diluent gas and fluorochemicals to an elevated pressure;

(b) heating the gas stream containing a diluent gas and fluorochemicals to an elevated temperature sufficient to increase the flux of the permeate stream of step (c) and to increase the selectivity of the membrane of step (c) for the permeation of the diluent gas of step (c) relative to the permeation of the fluorochemicals of step (c);

(c) contacting the gas stream with a membrane which is selectively more permeable to the diluent gas than the fluorochemicals to result in a permeate stream rich in the diluent gas and a retentate rich in fluorochemicals;

(d) contacting the retentate with one or more additional membranes which are selectively more permeable to the diluent gas than the fluorochemicals to result in a second permeate stream rich in the diluent gas and a second retentate rich in fluorochemicals; and (e) recycling the second permeate stream to step (a) to be compressed with the gas stream containing diluent gas and fluorochemicals to an elevated pressure.

2. The method of claim 1 wherein the gas stream containing a diluent gas and fluorochemicals is initially scrubbed to remove particulates and water soluble components of the gas stream.

3. The method of claim 1 wherein after step (e) the second retentate rich in fluorochemicals is further purified by adsorption or low temperature rectification to provide a fluorochemical rich product, stream and a diluent rich vent stream.

4. The method of claim 3 wherein the rectification is driven by heat exchange of the overhead in a rectification column to produce reflux.

5. The method of claim 3 wherein the fluorochemical rich product stream comprises $C_2F_6$.

6. The method of claim 3 wherein the gas stream containing a diluent gas and fluorochemicals is an effluent gas stream from a semiconductor fabrication process and the fluorochemical rich product stream is recycled to the semiconductor fabrication process.

7. The method of claim 1 wherein the gas stream containing a diluent gas and fluorochemicals contains fluorochemicals selected from the group consisting of $NF_3$, $SF_6$, $CF_4$, $CHF_3$, $CH_3F$, $C_2F_6$, $C_2HF_5$, $C_3F_8$, $C_4F_8$ and mixtures thereof.

8. The method of claim 1 wherein the gas stream containing a diluent gas and fluorochemicals is an effluent gas stream from a semiconductor fabrication process.

9. The method of claim 8 wherein the second retentate rich in fluorochemicals is recycled to the semiconductor fabrication process.

10. The method of claim 1 wherein the membranes are selected from the group consisting of polysulfone, polyetherimide, polypropylene, cellulose acetate, polymethylpentane, amorphous copolymers based on 2,2-bistrifluoromethyl-4,5-difluoro-1,3-dioxole, polyvinyltrimethylsilane, polyimide, polyamide, polyaramide, ethyl cellulose and mixtures thereof.

* * * * *